(12) United States Patent
Kychakoff et al.

(10) Patent No.: US 7,434,988 B1
(45) Date of Patent: Oct. 14, 2008

(54) LOW PRESSURE ACOUSTIC PYROMETER SIGNAL GENERATOR

(75) Inventors: George Kychakoff, Maple Valley, WA (US); Michael F. Anna, Edmonds, WA (US); Ed Danzer, Tenino, WA (US)

(73) Assignee: Enertechnix, Inc., Maple Valley, WA (US)

( * ) Notice: Subject to any disclaimer, the term of this patent is extended or adjusted under 35 U.S.C. 154(b) by 203 days.

(21) Appl. No.: 11/436,733

(22) Filed: May 17, 2006

(51) Int. Cl.
*G01K 11/22* (2006.01)

(52) U.S. Cl. ................. 374/117; 374/118; 374/119; 374/E11.009; 374/143

(58) Field of Classification Search ......... 374/117–119, 374/E11.009, E11.01, E11.011, E11.012, 374/141–143; 73/25.01
See application file for complete search history.

(56) References Cited

U.S. PATENT DOCUMENTS

| | | | |
|---|---|---|---|
| 4,049,078 A * | 9/1977 | Paitson et al. | 181/120 |
| 4,317,366 A | 3/1982 | Tewes et al. | 374/115 |
| 4,432,299 A | 2/1984 | Smith | 116/137 |
| 4,541,279 A | 9/1985 | Schomberg | 73/597 |
| 4,618,268 A | 10/1986 | Horner | 374/115 |
| 4,772,131 A | 9/1988 | Varela et al. | 374/118 |
| 4,848,924 A | 7/1989 | Nuspi et al. | 374/117 |
| 5,195,140 A | 3/1993 | Kudo et al. | 381/63 |
| 5,197,019 A | 3/1993 | Delon-Martin et al. | 600/443 |
| 5,349,859 A | 9/1994 | Kleppe | 374/117 |
| 5,360,268 A | 11/1994 | Hayashi et al. | 374/117 |
| 5,392,645 A | 2/1995 | Kleppe | 73/195 |
| 5,404,833 A | 4/1995 | Kleppe | 116/137 |
| 5,437,506 A | 8/1995 | Gray | 374/119 |
| 5,519,644 A | 5/1996 | Benton | 374/132 |
| 5,586,061 A | 12/1996 | Williams et al. | 702/130 |
| 5,624,188 A | 4/1997 | West | 374/117 |
| 5,735,604 A | 4/1998 | Ewals et al. | 374/134 |

(Continued)

FOREIGN PATENT DOCUMENTS

WO    WO 9901727 A2 *    1/1999

*Primary Examiner*—Edward Lefkowitz
*Assistant Examiner*—Bret Adams
(74) *Attorney, Agent, or Firm*—J. Michael Neary

(57) ABSTRACT

An acoustic pyrometer measures the average gas temperature across a space of known distance, especially turbulent, high temperature gas loaded with caustic particulates. It includes an acoustic signal generator that generates a high amplitude acoustic signal with a short rise time The acoustic signal generator includes an outer tank closed at top and bottom ends by top and bottom end walls and enclosing an outer chamber. A cylinder is supported within the tank and has top and bottom opposed ends. A mid-plate extends across the cylinder and defines the bottom end, and an axial opening in the mid-plate receives a shaft of a piston assembly having an upper piston and a lower piston at ends of the shaft. A throat is attached to the bottom end, and receives the lower piston. The lower piston seals the throat when received in the throat. The upper piston is slidable in the cylinder under influence of air pressure. A pneumatic operating system for charging said cylinder and said outer chamber with gas at a moderate pressure includes a coupling for connection to a source of gas pressure and a remotely operated vent to allow pressurized gas in the cylinder to escape, thereby allowing the piston assembly to open said throat and allow pressurized gas to escape and produce a shock wave for use by the acoustic pyrometer.

17 Claims, 2 Drawing Sheets

U.S. PATENT DOCUMENTS

| | | | |
|---|---|---|---|
| 5,942,709 A | 8/1999 | Szalay | 84/616 |
| 6,039,472 A | 3/2000 | Shilk | 374/117 |
| 6,048,094 A | 4/2000 | Tornare | 374/183 |
| 6,311,803 B1 | 11/2001 | Turk | 187/394 |
| 6,386,755 B1 | 5/2002 | Draxton et al. | 374/117 |
| 6,726,358 B2 | 4/2004 | Draxton et al. | 374/115 |
| 6,834,992 B2 | 12/2004 | Draxton et al. | 347/115 |
| 2002/0131472 A1* | 9/2002 | Draxton et al. | 374/115 |

* cited by examiner

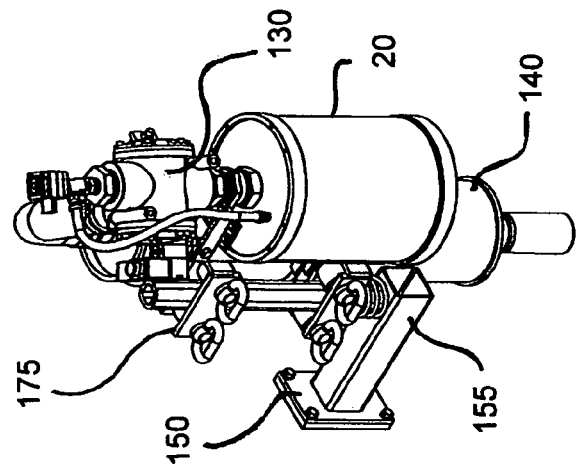
Fig. 2
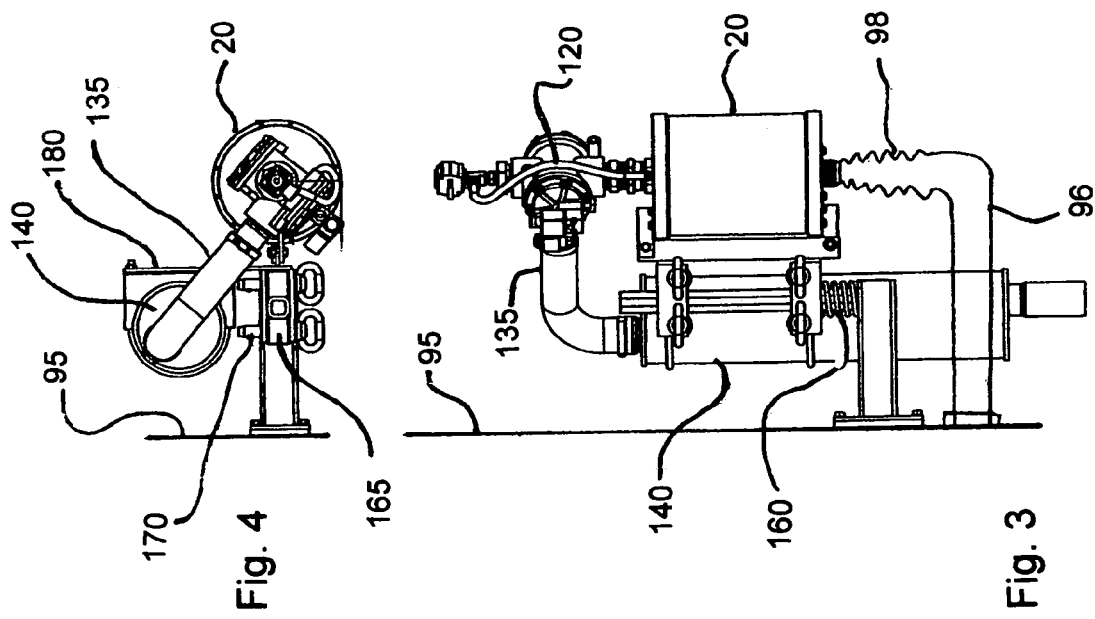
Fig. 4
Fig. 3

LOW PRESSURE ACOUSTIC PYROMETER SIGNAL GENERATOR

This invention pertains to temperature measurement, and more particularly to measurement of temperatures using an unassisted source of plant air pressure in a noisy, dirty and corrosive environment such as a cement kiln or petro-chemical plant.

BACKGROUND OF THE INVENTION

Cement kiln operations are significantly influenced by operational parameters that vary with changing environmental factors, including ambient temperature, humidity, coal composition, etc. Gas temperatures in the kiln, including furnace exit gas temperatures, are influenced by these factors, as well as by adjustments that can be made to the furnace apparatus, such as burner configuration and orientation, air flow rate, fuel feed rate, etc.

Gas temperatures profoundly affect the performance of a kiln in several ways. The thermal $NO_x$ formation rate increases exponentially at temperatures over 2700° F. There is strong regulatory pressure to reduce $NO_x$ emissions, but the fundamental knowledge of furnace exit gas temperatures, the primary factor in $NO_x$ formation, is lacking in cement kilns because existing temperature measurement technology is incapable of producing accurate temperature data in large boilers.

The long felt need for improved accurate temperature measurement in petro-chemical plants and cement kilns exists because the prior art measurement techniques are inadequate to reliably produce accurate temperature measurement in these environments. Thermocouple probes are unreliable and fail quickly in corrosive environments. Optical methods have limited penetration and are difficult to interpret. Prior acoustic methods have not proven accurately in noisy and dirty environments, in part because they are unable to accurately detect the onset of the acoustic signal in high amplitude background noise.

Thus, there has long been a need for accurate temperature measurements in cement kilns that enable improvements to be made in efficiency, and also in product uniformity and consistency. The temperature measurement would also be useful in minimizing $NO_x$ formation by reducing the dwell time at high temperature.

An acoustic pyrometer is shown in U.S. Pat. Nos. 6,386,755; 6,726,358, and 6,834,992. The acoustic pyrometer shown in these patents has been proven to be accurate and reliable in large boilers, but has required higher air pressure for its operation than is typically available in plant air systems, so an air amplifier is normally used to boost the air pressure to the desired range for optimal operation. The air amplifier is an additional expense and requires additional maintenance, and would be a candidate for elimination from the acoustic pyrometer system if a satisfactory signal generator could be designed that did not require elevated air pressure for operation. Thus, a need exists for an acoustic pyrometer that can operate accurately and reliably with a source of air pressure afforded by typical plant air systems.

SUMMARY OF THE INVENTION

Accordingly, this invention provides an improved acoustic pyrometer that can make accurate measurements of elevated gas temperatures in dirty and noisy process spaces in the presence of substantial acoustic noise. This improved acoustic pyrometer has the capability of performing advanced diagnostic functions regarding the internal operation of a high temperature process chamber such as a cement kiln or petrochemical plant.

The invention includes an improved signal generator that can be used in an acoustic pyrometer for measuring the average gas temperature across an open space of a known distance. It includes an acoustic signal generator for generating an acoustic signal with a high amplitude sudden onset or short rise time. The acoustic signal generator includes a tank closed at top and bottom ends by top and bottom end walls and enclosing a first chamber. A cylinder is supported proximate to the tank and has top and bottom opposed ends. A mid-plate extends across the cylinder and defines the bottom end of a second chamber, and an axial opening in the mid-plate receives a shaft of a piston assembly having an upper piston, which moves in the second chamber, and a lower piston at ends of the shaft. A throat is attached to the bottom end, and receives the lower piston. The lower piston seals the throat when received in the throat. The upper piston is slidable in the cylinder under influence of air pressure. A pneumatic operating system for charging the first and second chambers with gas at a moderate pressure includes a coupling for connection to a source of gas pressure and a remotely operated vent to allow pressurized gas in the cylinder to escape, thereby allowing the piston assembly to open the throat and allow pressurized gas to escape and produce a shock wave for use by the acoustic pyrometer.

DESCRIPTION OF THE DRAWINGS

The invention and its many attendant benefits and advantages will become better understood upon reading the following detailed description of the preferred embodiments in conjunction with the following drawings, wherein:

FIG. 2 is a perspective view of a signal generator of the acoustic pyrometer of this invention shown in FIG. 1, mounted on a tube wall of a process chamber;

FIG. 3 is an elevation of the acoustic signal generator shown in FIG. 2; and FIG. 4 is a plan view of the acoustic signal generator shown in FIG. 3.

DESCRIPTION OF THE PREFERRED EMBODIMENTS

Figure 1:
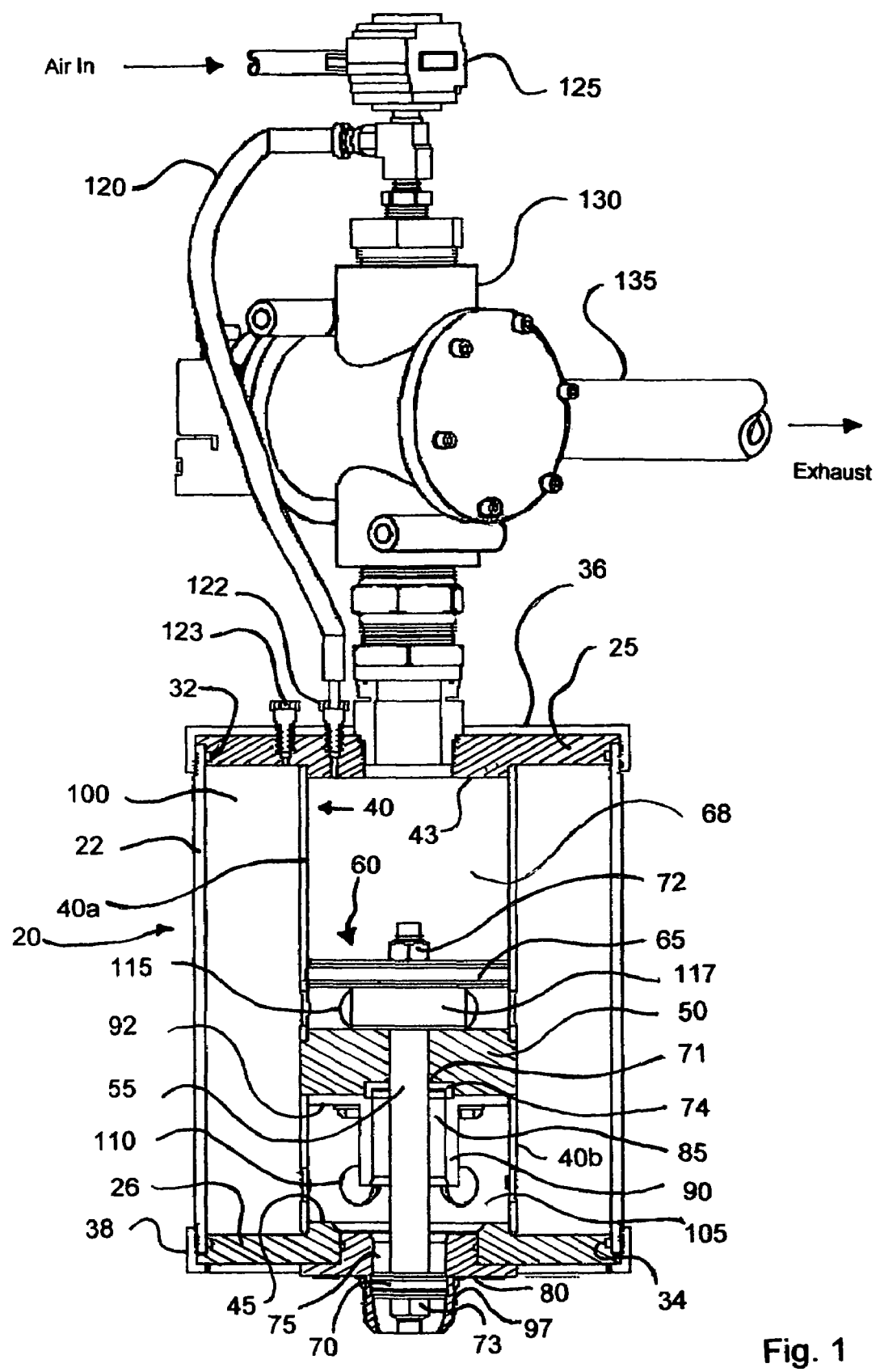
FIG. 1 is an elevation, partly in section, of an acoustic signal generator for an acoustic pyrometer in accordance with this invention.

Turning now to the drawings, wherein like reference numerals designate identical or corresponding parts, an acoustic signal generator for an acoustic pyrometer of the type disclosed in U.S. Pat. Nos. 6,386,755; 6,726,358, and 6,834,992 is shown in FIG. 1 having a cylindrical tank 20, including a tank wall 22 and top and bottom end plates 25 and 26 which close the ends of the tank 20 and are sealed by seals 32 and 34 to retain gas pressure within the tank 20. The top and bottom plates are secured in place by top and bottom screw-on caps 36 and 38.

It should be noted that the use of orientation-related names like "top" and "bottom" are merely for convenience in helping to identify the parts in the drawings and are not meant to be limiting to the scope of the invention. For example, the disclosed signal generator could also be operated with equal effectiveness in the inverted position or even on its side.

A two-part inner cylindrical tube 40 is clamped in place between the top and bottom end plates 25 and 26 and held in position by shallow protrusions 43, 45 on the top and bottom plates 25, 26 that fit into the top and bottom of the inner cylindrical tube 40. The inner tube 40 is in two parts: a top inner tube 40a and a bottom inner tube 40b. The two parts 40a and 40b are linked by a mid-plate 50 that is mounted across the interior of the inner tube 40 at the bottom of the top inner tube 40a and the top of the bottom inner tube 40b.

A center hole in the mid-plate 50 receives a piston rod 55 of a piston assembly 60, which includes an upper piston 65 and a lower piston 70, connected to top and bottom ends of the piston rod 55 by nuts 72 and 73. the piston rod 55 is sealed in the center hole by a seal 71 held in place by a seal cover 74. When the piston assembly 60 moves, the upper piston 65 runs vertically in an upper cylindrical chamber 68 within the top inner tube 40a. At the same time, the lower piston 70 runs between a throat 75 extending through a throat plate 80 mounted to the bottom end plate 26, and a cushion chamber 85 defined within a cylindrical, downwardly-opening tube 90 depending from a cushion flange 92 that is fastened to the underside of the mid-plate 50. A rigid, large diameter conduit 96 (shown in FIG. 3), communicating with a wall 95 of the process chamber in which the temperature is to be measured, is connected to an externally threaded fitting 97 depending from the throat plate 80 via a flexible, steel wrapped hose 98.

The cylindrical outer tank wall 20 and the inner cylindrical tube 40 define the outer and inner boundaries of a first or outer chamber 100, which in operation is charged with air under pressure to operate the acoustic signal generator. The outer chamber 100 communicates with a lower chamber 105 through several large holes 110 in the bottom inner tube 40b. Likewise, the outer chamber 100 communicates with the second or upper cylindrical chamber 68 through several large holes 115 in the bottom inner tube 40b. A spacer 117 prevents the upper piston 65 from dropping lower than the top of the holes 115.

Air under pressure is admitted to the tank of the acoustic signal generator through an air hose 120 attached via a fitting 122. A second fitting 123 could also be used to recharge the acoustic signal generator more quickly if desired, but if the second fitting 123 is used, it should be sized to pressurize the outer chamber 100 more slowly than the top chamber 68 to ensure that the piston assembly is moved to its lower-most position early in the process. The air is typically provided by plant air, normally in the range of 85-125 psi. It is controlled by a valve 125, which is attached for convenience atop an exhaust valve 130, which has an exhaust pipe 135 coupled to a muffler 140, shown in FIGS. 2-4. The inlet air control valve 125 could be a solenoid valve or, since it is typically turn on and left on for the duration of operation of the system, could be a manual valve. The fitting 122 could be in the pipe leading from the exhaust valve instead of the top of the top chamber 68 and fill the top chamber 68 through the fitting to the exhaust valve.

In operation, the valve 125 is turned on to admit air under pressure through the hose 120 into the upper cylindrical chamber 68. This air pressure, acting on the upper face of the upper piston 65, moves the piston assembly 60 to the position shown in FIG. 1, if it were not already in that position. Pressurized air bleeds around the top of top inner tube 40a from upper cylindrical chamber 68 to outer chamber 100. The flow path of this air bleeding from the chamber 68 into the chamber 100 constitutes a restricted flow path which could be replaced with a restriction in the piston 65 or a restricted flow path through the top end plate 25. Since the upper cylindrical chamber 68 pressurizes first, the piston assembly 60 is pushed to its lower-most position. This is defined when the upper piston 65 contacts the spacer 117.

Air flows from outer chamber 100 via the holes 115, pressurizing the space beneath the upper piston 65. Air flows from outer chamber 100 to lower chamber 105 via holes 110. Air flows from the lower chamber 105 to the cushion chamber 85 via the open cylinder end of the cylindrical, downwardly-opening tube 90. As soon as the pressures in chambers 68, 100 and 105 equalize (approximately 10 seconds) all of the chambers are at line pressure (80-125 psi) and the system is ready to fire.

The system is fired by operating the exhaust valve 130 by a solenoid, (not shown). The exhaust valve 130 opens and allows the pressurized air in the upper cylindrical chamber 68 to vent through the exhaust pipe 135 and a muffler 140. The air pressure in the upper cylindrical chamber 68 drops to ambient, and air pressure under the piston 65 accelerates the piston 65 and the entire piston assembly 60 towards the top. Once the piston assembly 60 travels approximately one inch, the lower piston 70 exits the throat 75, allowing air to rush suddenly from the lower chamber 105 and the outer chamber 100 into the throat 75 and down the conduit 96 to the process chamber, creating a sonic shock wave that is used by the acoustic pyrometer to measuring the temperature in the process chamber being measured.

After the lower piston 70 clears the throat 75, the piston assembly 60 continues to accelerate under the influence of air pressure under the upper piston 65 until the lower piston 70 enters the cushion chamber 85. In the cushion chamber 85, the lower piston 70 compresses the air trapped in the cushion chamber and decelerates as the air pressure in the cushion chamber behind the lower piston 70 increases. After the upward velocity of the lower piston 70 reaches zero, the pressure in the cushion chamber 85 reverses the direction of the piston assembly 60 and accelerates the piston assembly 60 downwardly until the lower piston exits the cushion chamber 85. When the piston assembly 60 stops, the lower piston 70 remains somewhere below the cushion chamber 85 and the lower-most position of the piston assembly 60.

The exhaust valve 130 closes, typically about one second after it opens, and compressed air fills the upper cylindrical chamber 68 via the hose 120, and the process repeats until the valve 125 is shut off.

It is contemplated that the exhaust valve 130 could be operated to open and close fast enough to allow the piston assembly 60 to move rapidly and pull the lower piston 70 out of the throat 75, but the exhaust valve 130 then would close the exhaust and allow the upper piston to pressurize the air in the top chamber 68 which would act as a decelerating air cushion in place of the cushion chamber 85. However, this would require an exhaust valve 130 that could operate reliably in a precisely timed very short interval.

Another more simplified alternative cushion scheme for decelerating the piston assembly after the lower piston has cleared the throat is to size the exhaust opening so as to allow the air in the upper chamber 68 to vent fast enough that the piston assembly accelerates rapidly to pull the lower piston out of the throat rapidly, but the air in the upper chamber 68 is restricted from exhausting rapidly enough to permit the piston assembly to strike the mid-plate or the top plate 25. An exhaust opening of about 7/16" provides a suitable size to allow the desired operation.

An installation of the acoustic signal generator, as shown in FIGS. 2-4, includes a mounting pad 150 fastened to the wall 95 of the process chamber in which the temperature is to be measured. An L-shaped structural steel tube 155 is fastened to the pad 150 by suitable fasteners or welding, and the acoustic signal generator is supported on the L-shaped tube 155. Because of the shock incurred in the operation of the acoustic signal generator, it is supported for vertical movement on a spring 160 and two pairs of rollers 165 that allow the acoustic signal generator to move vertically on the vertical arm of the L-shaped tube 155. The rollers 165 are journalled on four pins 170 extending through plates 175 connected to a main support plate 180 to which both the muffler 140 and the cylindrical outer tank 20 is attached, allowing the entire apparatus to move vertically when the acoustic signal generator fires, thereby minimizing shock loads transmitted to the mounting structure and the wall 95 of the process chamber.

Obviously, numerous modifications and variations of the preferred embodiment described above are possible and will become apparent to those skilled in the art in light of this specification. For example, many functions and advantages are described for the preferred embodiment, but in some uses of the invention, not all of these functions and advantages would be needed. In addition, we contemplate the use of side-by-side pressure vessels positioned proximate to each other instead of the co-axial arrangement of tank 20 and inner cylinder 40 disclosed in FIG. 1. In such an arrangement, the first chamber would be in a separate vessel that would be connected by a large diameter external pipe to the lower chamber 105 of the separate cylinder 40, and could be filled to higher pressure if desired. Therefore, we consider the invention to include the use of these and other modifications and fewer than the complete set of noted functions and advantages. Thus, even though these contemplated embodiments of the invention are not specifically disclosed or specifically claimed, it is our intention that each and every one of these species and embodiments, and the equivalents thereof, be encompassed and protected within the scope of the following claims, and no dedication to the public is intended by virtue of the lack of claims specific to any individual embodiment. Accordingly, it is expressly intended that all these embodiments, species, modifications and variations, and the equivalents thereof, are to be considered within the spirit and scope of the invention as defined in the following claims.

We claim:

1. An acoustic signal generator for generating an acoustic signal with a high amplitude, sudden onset for measuring the temperature in a process chamber with an acoustic pyrometer, comprising:
   an outer tank closed at top and bottom ends by top and bottom plates, said outer tank enclosing a first chamber;
   a cylinder supported within said tank and having top and bottom opposed ends, said cylinder enclosing a second chamber;
   a mid-plate extending across said cylinder and defining said bottom end, and an axial opening in said mid-plate receiving a shaft of a piston assembly having an upper piston in said second chamber and a lower piston at a lower end of said shaft;
   a throat received in an opening through to said bottom plate and receiving said lower piston, said lower piston sealing said throat when received in said throat;
   said upper piston slidable in said in said cylinder under influence of air pressure;
   a pneumatic operating system for charging said first and second chambers with gas at a moderate pressure, said pneumatic operating system including a coupling for connection to a source of gas pressure and a remotely operated vent to allow said pressurized gas in said second chamber to escape through an exhaust opening, thereby allowing said piston assembly to open said throat suddenly and allow pressurized gas to escape rapidly from said first chamber through said throat and produce a shock wave that propagates into said process chamber for use by said acoustic pyrometer.

2. An acoustic signal generator as defined in claim 1, wherein:
   said cylinder includes a two-part cylindrical tube, said two-part cylindrical tube having a top tube and a bottom tube linked together by said mid-plate.

3. An acoustic signal generator as defined in claim 1, wherein:
   said remotely operated vent includes a solenoid operated exhaust valve.

4. An acoustic signal generator as defined in claim 1, further comprising:
   a muffler coupled to said exhaust to muffle exhaust noise when said pneumatic operating system operates to release gas under pressure through said exhaust.

5. An acoustic signal generator as defined in claim 1, further comprising:
   unrestricted openings between said first chamber and an area under said upper piston such that gas pressure acting on underside surfaces of said upper piston are equalized with gas pressure in said first chamber and that said upper piston is driven upwardly when pressure in said second chamber is vented by said pneumatic operating system.

6. An acoustic signal generator as defined in claim 5, wherein:
   said pneumatic operating system includes a restricted passage between said first and second chambers to allow gas under pressure to flow at a restricted rate into said first chamber from said second chamber such that said second chamber is pressurized before said first chamber to ensure that said piston assembly is moved to a position in which said lower piston is sealing said throat before pressure in said first and second chambers equalizes.

7. An acoustic signal generator as defined in claim 1, further comprising:
   a compliant suspension for mounting said acoustic signal generator to an exterior wall of said process chamber and allow said acoustic signal generator to move vertically when said pneumatic operating system operates to move said piston assembly to open said throat suddenly and mitigate shock resulting from said movement.

8. An acoustic signal generator as defined in claim 1, further comprising:
   an open-ended cushion chamber sized to snuggly receive said lower piston and attached to an underside of said mid-plate with said open end facing said lower piston such that, after clearing said throat, said lower piston moves into said cushion chamber, compresses gas in said cushion chamber, and decelerates under influence of said compressed gas in said cushion chamber.

9. An acoustic signal generator for generating an acoustic signal with a high amplitude, sudden onset, comprising:
   a tank closed at two ends by end walls, said tank enclosing a first chamber;
   a cylinder supported proximate to said tank and having top and bottom opposed ends and enclosing a second chamber;
   a mid-plate extending across said cylinder and defining said bottom end, and an axial opening in said mid-plate receiving a shaft of a piston assembly having an upper piston and a lower piston at ends of said shaft;
   a throat attached to said bottom end and receiving said lower piston, said lower piston sealing said throat when received in said throat;

said upper piston slidable in said in said cylinder under influence of air pressure;

a coupling for connection to a source of gas pressure and a remotely operated vent to allow said pressurized gas in said second chamber to escape, thereby allowing said piston assembly to open said throat and allow pressurized gas to escape and produce a shock wave as a leading edge of said acoustic signal.

10. An acoustic signal generator as defined in claim 9, further comprising;

a cushion chamber in said cylinder in which one of said pistons moves to compress gas and decelerate said piston assembly after said lower piston has cleared said throat.

11. An acoustic signal generator as defined in claim 10, wherein;

said cushion chamber includes said second chamber and said exhaust opening sized such that gas in said second chamber is allowed to vent fast enough that said piston assembly accelerates rapidly to pull said lower piston out of said throat rapidly, but restricts gas from exhausting rapidly enough to permit the piston assembly to strike said mid-plate or said top end of said cylinder.

12. An acoustic signal generator as defined in claim 9, further comprising;

a compliant suspension for mounting said cylinder to a support structure and allow said cylinder to move vertically when said piston assembly opens said throat suddenly and releases gas under pressure to rush out through said throat, said compliant suspension thereby softening any resulting shock.

13. An acoustic signal generator as defined in claim 9, further comprising;

unrestricted gas flow passages between said first chamber and an area under said upper piston such that gas pressure acting on an underside surface of said upper piston are equalized with gas pressure in said first chamber and that said upper piston is driven upwardly by said gas pressure acting against said underside surface of said upper piston when pressure in said second chamber is vented.

14. An acoustic signal generator as defined in claim 13, further comprising:

a restricted passage between said first and second chambers to allow gas under pressure to flow at a restricted rate into said first chamber from said second chamber such that said second chamber is pressurized before said first chamber to ensure that said piston assembly is moved to a position in which said lower piston is sealing said throat before pressure in said first and second chambers equalizes.

15. An acoustic signal generator as defined in claim 9, further comprising;

said cylinder includes a two-part cylindrical tube, said two-part cylindrical tube having a top tube and a bottom tube linked together by said mid-plate.

16. An acoustic signal generator as defined in claim 9, wherein;

said remotely operated vent includes a solenoid-operated exhaust valve that can be operated to rapidly exhaust pressurized gas from said second chamber through an exhaust opening.

17. An acoustic signal generator as defined in claim 16, further comprising:

a muffler coupled to said exhaust opening to muffle exhaust noise when said exhaust valve operates to release gas under pressure from said second chamber through said exhaust opening.

* * * * *